Aug. 9, 1927. 1,638,091
W. A. ECKERT
SIGNAL CONTROLLING MECHANISM FOR AUTOMOBILES
Filed Aug. 22, 1923 2 Sheets-Sheet 1
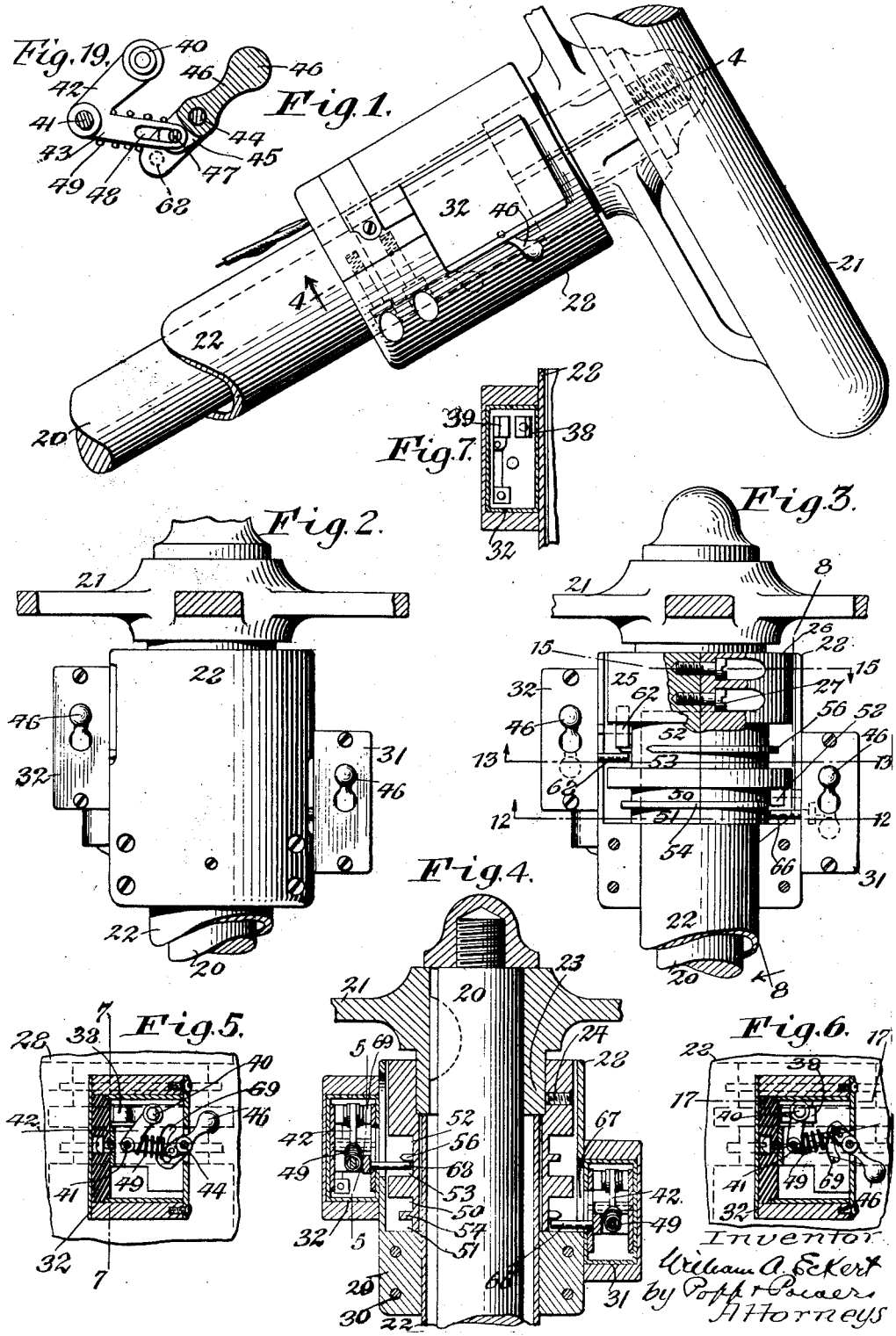

Aug. 9, 1927.  
W. A. ECKERT  
1,638,091  
SIGNAL CONTROLLING MECHANISM FOR AUTOMOBILES  
Filed Aug. 22, 1923  
2 Sheets-Sheet 2
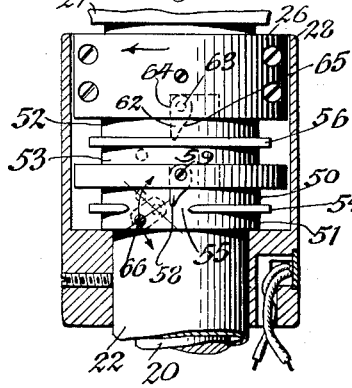
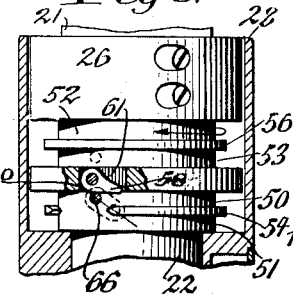
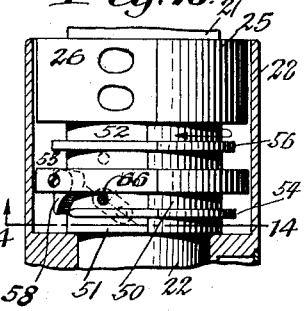
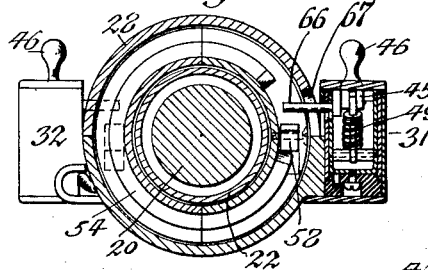
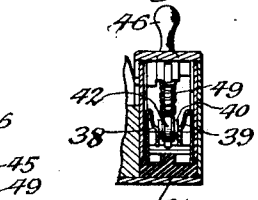
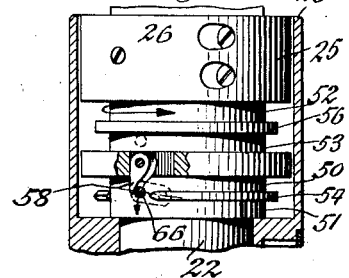
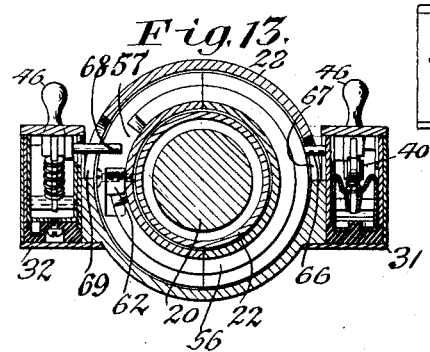
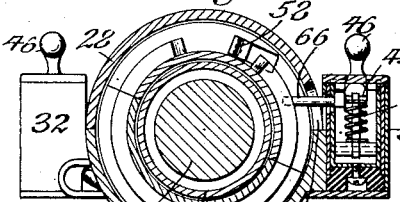
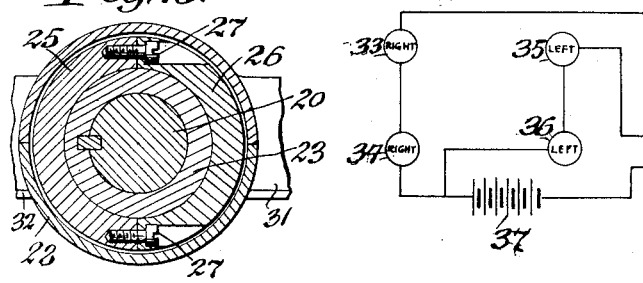
Inventor  
William A. Eckert  
by Popp & Powers  
Attorneys Patented Aug. 9, 1927.

1,638,091

UNITED STATES PATENT OFFICE.

WILLIAM A. ECKERT, OF BUFFALO, NEW YORK.

SIGNAL-CONTROLLING MECHANISM FOR AUTOMOBILES.

Application filed August 22, 1923. Serial No. 658,612.

This invention relates to a signal mechanism for automobiles which will enable the driver to give a signal indicating the direction in which he is about to turn and which when once set and a partial turn of the vehicle in the corresponding direction has been effected cannot be unset or returned to its neutral position until after the vehicle has completed the turn, after which the signal may be automatically restored to its neutral position during the operation of straightening out the course of the vehicle.

It is the object of this invention to provide an improved mechanism for accomplishing this purpose and which can be easily applied to the standard types of automobiles now in general use and capable of being produced at low cost.

In the accompanying drawings: Figure 1 is a fragmentary side elevation of the steering post, wheel and column of an automobile steering mechanism equipped with my improved direction signaling mechanism. Figure 2 is a front elevation, partly in section, of the same. Figure 3 is a view similar to that shown in Figure 2 with the front part of the casing or the cover removed and a part of the carrier shown in section. Figure 4 is a longitudinal section taken on line 4—4, Figure 1 looking in the direction of the arrow associated with this line. Figure 5 is a vertical section taken on line 5—5, Figure 4 and showing one of the switches in its open position. Figure 6 is a similar view showing the switch in its closed position. Figure 7 is a fragmentary longitudinal section taken on line 7—7, Figure 5. Figure 8 is a longitudinal section taken on line 8—8, Figure 3 looking in the direction of the arrow associated with this line and showing the parts in their neutral position. Figure 9 is a view similar to Figure 8 showing the parts in the position they occupy when the signal has been set for turning toward the right and the steering post has been turned part way in this direction. Figure 10 is a similar view showing the position of the parts when the signal has been set for turning to the right and the steering post has completed its rotation in that direction. Figure 11 is a similar view showing the manner in which the signal which has been set for turning to the right is automatically unset or restored to neutral upon turning the steering post backwardly after the same has been turned to the right. Figures 12 and 13 are cross sections taken on the correspondingly numbered lines in Figure 3 and showing the position of the parts when both the right and left hand switches and the steering post are in neutral position. Figure 14 is a sectional view similar to Figure 12 showing the right hand switch shifted into its closed position and the steering post turned part way toward the right and the controlling means in operation for holding the right hand switch in its closed position. Figure 15 is a cross section taken on line 15—15, Figure 3. Figure 16 is a fragmentary sectional elevation of the housing or casing, partly in section, viewing the same from the rear and also showing the electric circuits in diagrammatic form. Figure 17 is a fragmentary cross section of the contact arm on one of the switches, which carries the movable or bridge contact forming part of the respective switch. Figure 18 is a sectional view of the right hand electric switch showing the same in its closed position. Figure 19 is a detached sectional view of the left hand electric switch, on an enlarged scale.

Similar characters of reference refer to like parts in the several figures.

Although this signal mechanism may be varied in its details of construction and mounted on various forms of steering mechanisms for automobiles and the like, the same, for example, is shown in the drawings associated with a steering mechanism having a rotary steering post or shaft 20, which is provided at its upper end with a hand wheel or steering wheel 21 for turning the same, and a stationary column or standard 22 which surrounds this post and in which the latter is journaled in any well-known or approved manner.

Surrounding the upper end of the column and the lower part 23 of the hub of the steering wheel is a carrier which is generally of cylindrical form and secured to the hub of the steering wheel, so as to be compelled to turn therewith by any suitable means, for instance, by a set screw 24, as shown in Figure 4. For convenience in applying the signaling device to the steering wheel, as well as removing the same therefrom, this carrier is divided diametrically and lengthwise into two equal parts 25, 26, which parts are connected with each other by means of screws 27 which pass through the corresponding ends of these sections, as shown in Figure 15.

Surrounding this carrier is an enclosing cylindrical casing 28, the lower portion 29 of which forms an enlarged base which embraces the stationary column below the sections 25, 26 of the carrier. This casing is likewise constructed in two sections which are divided diametrically and are secured to each other and also clamped on the steering column by means of screws 30 passing through the corresponding ends of the base of the casing sections. On its right and left hand sides, the casing is provided with lateral, hollow extensions 31, 32 in which are mounted electrical switches, which are adapted to be opened and closed for the purpose of giving a signal to persons adjacent to the respective automobile as to the direction the driver intends to take. In the present instance, the car is assumed to have electric lamps 33 and 34 at the front and rear ends of its right side and similar lamps 35, 36 at the front and rear ends of its left hand side, one or the other of these pairs of lamps being adapted to be lighted for giving the desired signal. In the present case, each of these pairs of lamps is arranged in series, one end of which is connected with one pole of the battery 37. The other pole of this battery is connected with two contacts 38, one of which is arranged in the upper part of each casing extension and stands opposite a companion contact 39 arranged in the adjacent part of the respective casing extension. One of the contacts 39 is connected with the opposite side of the right hand lights and the other contact 39 is connected with the other side of the left hand lamps, so that upon electrically connecting one or the other pair of contacts 38 and 39, the electric circuit will be closed through one or the other of these pairs of lamps and cause the same to be lighted by the current of the battery.

Each pair of contacts 38, 39 is adapted to be connected and disconnected by means of a bridge contact 40 of metal which is movable into and out of engagement with the opposing sides of the same. Each of these movable contacts 40 may be operated in any suitable manner, but preferably by means of an elbow lever arranged in one of the housing extensions 31 or 32 and pivotally mounted thereon by means of a pin 41 and having an upper arm 42 which carries the contacts 40 but is insulated therefrom and a lower arm 43 projecting forwardly from said pivot. This elbow lever is rocked for the purpose of engaging its contact or bridge piece 40 with the respective pair of contacts 38, 39 by means of a hand lever pivoted upon one of the extensions 31 or 32, by means of a horizontal pin 44 and having an inner arm 45 arranged within the respective casing extension and an outer arm or finger piece 46 projecting through a slot on the front side of this casing extension, so that the same is accessible to the driver of the automobile. The connection between the inner arm of the hand lever and the lower arm of the elbow lever is preferably effected by means of a pin 47 arranged on the inner arm of the hand lever and working in a longitudinal slot 48 in the lower arm of the elbow lever.

It follows from this construction that when the handle 46 of the hand lever is depressed, the elbow lever will be rocked in the direction for engaging its bridge contact 40 with the opposing sides of the companion pair of contacts 38, and 39 thereby closing the electric circuit of one pair of lamps while upon raising the finger piece or handle 46, these parts will be moved in the opposite direction and the respective electric circuit and the lamps therein will be extinguished.

By this means, it is possible to light the signal lamps on either the right or the left hand sides of the car and thus give notice to pedestrians and drivers of other cars the direction in which the driver of the particular car intends to turn from the course he is then pursuing.

In order to yieldingly hold each of these electric switches in its opened or closed position, a spring 49 is applied to the lower arm 43 of each of the elbow levers and arranged to bear at its front end against the inner arm 45 of the hand lever and at its rear end against its upper arm of the elbow lever, as best shown in Figure 19. When the elbow lever and hand lever of each switch are turned to either extremities of their movements, the spring 49 operates to yieldingly hold these parts in this position, but when either one of the hand levers is turned in one direction or the other, the spring 49 is first compressed between the arms 42 and 45 until the dead center between the axes of the hand and elbow levers has been passed after which the expansion of this spring operates to complete the movement of these levers in the direction in which they have been started by hand.

Means are provided whereby one or the other of the electric signal switches, after the same have been once moved into an operative or closed position, and the steering wheel has effected the initial part of its turning movement in the respective direction will prevent the driver or any one else from opening this circuit until after the automobile has completed the turn in the direction for which the signal has been set, said controlling means being so organized that when the vehicle is about to complete its turning movement in response to the operation of the steering mechanism, the electric switch will be automatically opened and thus avoid the necessity of the attendant paying any attention to unsetting the signal after the same has been once set to indicate a particular direction of intended movement.

The preferred form of these controlling means whereby this is accomplished is shown in the drawings and constructed as follows:

On the lower part of the cylindrical collar which turns with the steering wheel is arranged an upper circumferential locking channel 50 and a lower circumferential holdout channel 51 which together form a pair for cooperation with means which control the right hand signal switch, and on the upper part of this carrier or sleeve, the same is provided with an upper circumferential locking channel 52 and a lower circumferential holdout channel 53 which together form a pair for cooperation with the electric switch which controls the left hand switch. The wall 54 between the lower pair of channels is provided with a vertical passage 55 and the wall 56 between the upper pair of channels 52, 53 is provided with a vertical passage 57, these passages 55 and 57 being arranged on diametrically opposite sides of the column, and preferably on the right and left sides thereof. Immediately above the right hand passage 55, a dog, latch or pawl 58 is pivoted on the adjacent part of the carrier by means of a horizontal pin 59, which latch is capable of swinging from a pendant position in which it extends across the lower locking channel 50, as shown in full lines in Figure 8, forwardly and upwardly into a position in which the same clears this channel, as shown by full lines in Figure 9, said latch being prevented from moving backwardly by engagement of its rear flat side with a stop surface 60 on the adjacent part of the carrier, and the front side of this latch being provided with a cam surface 61.

A similar latch 62 is arranged immediately above the passage 57 in the wall 56 between the upper locking and holdout channels and is pivoted at its upper end by means of a horizontal pin 63 to the adjacent part of the carrier and is free to swing forwardly and upwardly from a pendant position across the upper locking channel 52 into a position in which the same clears this channel, this latch being prevented from swinging rearwardly from a pendant position by engagement of its flat rear side with a stop shoulder 64 on the adjacent part of the carrier and the front side of this latch being provided with a cam surface 65.

The inner arm of the hand lever of the right hand electric switch is provided with a shifting pin or tappet 66 which projects inwardly through a slot 67 in the casing and is adapted to move with its inner extremity through the passage 55 so as to be in line with either of the circumferential channels 50 or 51. Similarly the inner arm of the hand lever of the left hand switch is provided with a controlling pin or tappet 68 which projects through a slot 69 in the casing and is adapted to have its inner extremity pass through the passage or gap 57 into line with the upper or lower channels 52, 53.

In the neutral position of the signaling mechanism, the outer arms or finger pieces 46 of both switch operating hand levers are turned into their elevated position, so that the bridge contacts 40 of both elbow levers are disengaged from the two pairs of stationary contacts 38, 39, whereby both the right and left hand lamps of the automobile are extinguished, this being the position of the parts when the driver of the automobile intends to continue running his machine straight ahead on the roadway. If the driver contemplates turning either to the right or to the left, he depresses the outer arm 46 of the respective electric switch hand lever, whereby the corresponding elbow lever is turned for engaging its bridge contact 40 with the companion fixed contacts 38 and 39 and thus lighting the signal lamps on that side of the car. After the respective hand lever is turned for thus closing the electric circuit on that side of the car, the corresponding controlling pin or tappet, for example 66 is raised from the position shown by full lines in Figure 8, which registers with the lower holdout channel 51, to the position shown by dotted lines in the same figure, which causes this controlling pin or tappet to pass through the passage 55 and stand in the controlling channel 50 and behind the latch 58. Upon now turning the steering post in the direction for steering the car to the right, the first effect will be to cause the latch 58 to engage with the elevated shifting pin 66 and to be lifted thereby so that it clears this controlling pin, as shown by full lines in Figure 9. As the steering post continues its rotary motion and completes its movement in this direction, the latch 58 drops off from the pin 66 into a pendant position in rear of the same, as shown by full lines in Figure 10. As the latch 58 passes over the controlling pin 66, the locking groove 50 receives this pin, as shown in Figure 10, and thereby prevents the driver from turning the right hand switch lever 45, 46 in the direction for opening the right hand electric switch, thereby maintaining illumination of the right hand signal lamps while the vehicle is thus making its right hand turn. Upon reversing the rotation of the steering post for the purpose of straightening out the automobile after it has made this right hand turn, the cam surface 61 of the right hand latch 58 engages with the right hand controlling pin 66 and moves the latter downwardly from a position in line with the locking groove or channel 50 through the passage or gap 55 and into line with the lower holdout channel 51, which operation is shown as partly completed in Figure 11. Upon thus moving the controlling pin 66 from its upper position to its lower position in the manner indicated, the respective right hand switch is automatically opened and the lamps associated therewith are extinguished, thus indicating that the turn has been completed and the car is again traveling on a course straight ahead.

When the driver depresses the finger piece or handle 46 of the left hand switch, the parts of the latter are operated for closing the electric circuit of the left hand lamps and causing the latter to be lighted in the same manner as that described with reference to the right hand switch. During such operation with the left switch, its controlling pin or tappet 68 moves from a position in line with the holdout channel 53, through the passageway 57 and into the locking channel 52, so that upon subsequently turning the steering post in the proper direction for causing the car to turn to the left, this left hand controlling pin 68 will be first engaged by the left hand latch or dog 62, so that the latter will be raised and caused to trip over the pin 68 during the initial part of the left hand turning motion of the steering post, and thereafter the pin 68 will be in front of this last mentioned latch, so that upon subsequently reversing the turning movement of the steering post for again straightening out the vehicle, the cam surface 65 of the left hand latch will operate on the pin 68 and move the latter downwardly from the upper channel 52 through the passage 57 and into line with the passage 53, thereby opening the left hand electric switch and automatically extinguishing the left hand signal lamps. Whenever the steering post is turned in one direction or the other, the circumferential wall separating each pair of channels or grooves in the carrier passes over the controlling pin of the respective electric switch which has not been shifted into its closed position, thereby preventing that particular controlling pin or tappet from being elevated and the respective lamps for the corresponding side of the car from being lighted after the steering post has effected the initial part of its turning movement and thus avoiding giving confusing signals.

In the operation of the electric switches for opening and closing the circuits which they control, each of the controlling pins or tappets moves vertically and in a plane parallel with the axis of the steering post, which enables the switch mechanism to be built in close and thus produce a compact structure which will not unduly trespass upon the space around the steering mechanism which might be utilized for other purposes to advantage.

This signal controlling mechanism is positive and reliable in its operation, it is not liable to get out of order and permits of giving an effective signal by reason of the fact that when the signal is once set and a partial turn of the car is made in the corresponding direction, the operator is compelled to complete the turn in that direction before the signal can be again restored automatically to its normal condition.

I claim as my invention:

1. A signaling mechanism for an automobile having its steering gear provided with a rotary steering post and a stationary column surrounding said post, comprising a rotary carrier mounted on said post and provided on its periphery with a circumferential locking channel one wall of which is provided with a lateral passage, an electric switch mounted on said column and having a controlling pin movable in a plane parallel with the axis of said post and through said passage into and out of said locking channel, and shifting means which permit the entrance of said pin into said channel for closing said switch and also permit of turning said steering post in one direction and which operate to deflect said pin out of said locking channel for opening said switch upon turning said post in the opposite direction, said shifting means consisting of a latch pivoted on the carrier opposite said passage and adapted to swing into and out of an operative position across said locking channel, and provided on its front side with a cam face adapted to engage said pin and deflect the same out of said locking channel and adapted to engage its rear side with a shoulder on said carrier for arresting the backward swinging movement of the latch when the same projects across said channel and means for moving the controlling pin into the path of movement of said latch.

2. A signaling mechanism for an automobile having its steering gear provided with a rotary steering post and a stationary column surrounding said post, comprising a rotary carrier mounted on said post and provided on its periphery with a circumferential locking channel one wall of which is provided with a lateral passage, an electric switch mounted on said column and having a controlling pin movable in a plane parallel with the axis of said post and through said passage into and out of said locking channel, shifting means which permit the entrance of said pin into said channel for closing said switch and also permit of turning said steering post in one direction and which operate to deflect said pin out of said locking channel for opening said switch upon turning said post in the opposite direction, said switch comprising two fixed contacts arranged on the casing, an elbow lever one arm of which is operatively connected with said controlling pin and its other arm having a bridge contact adapted to connect said fixed contacts, a hand lever pivotally mounted on said column and having an outer arm adapted to be manipulated and an inner arm connected with that arm of the elbow lever which carries said controlling pin, and a spring interposed between said hand lever and elbow lever and operating to yieldingly hold the same in either extremities of their movement.

3. A signaling mechanism for an automobile having its steering gear provided with a rotary steering post and a stationary column surrounding said post comprising a rotary carrier mounted on said post and provided with a circumferential locking channel and a circumferential holdout channel, said channels being separated by an intervening wall having a passage connecting said channels, a latch mounted on said carrier and adapted to move into and out of said locking channel, a controlling pin movable through said passages into either of said channels, a movable cam mounted on said carrier and permitting said pin to remain in said locking channel upon moving the carrier in one direction and to deflect said pin from the locking channel through said passage and into said holdout channel upon moving the carrier in the opposite direction and means for moving the controlling pin into the path of movement of said latch, and an electric switch operatively associated with said controlling pin.

4. A signaling mechanism for an automobile having its steering gear provided with a rotary steering post and a stationary column surrounding said post comprising a rotary carrier mounted on said post and provided with two pairs of circumferential channels, each pair having a locking channel and a holdout channel which are connected with each other by a passage, the passages of the two pairs of channels being arranged on diametrically opposite sides of the carrier, two electric switches each having a controlling pin adapted to move through said passage so that either channel of the respective pair can receive the companion pin upon turning the carrier relatively to said pin, and means for permitting each locking channel to receive its respective controlling pin upon turning the carrier in one direction and deflecting said pin into line with the other channel of the pair upon turning the carrier in the opposite direction comprising a latch movably mounted on said carrier, and means for moving each controlling pin into the path of movement of the respective latch.

WILLIAM A. ECKERT.